US009652192B2

(12) United States Patent
Bhamidipati et al.

(10) Patent No.: US 9,652,192 B2
(45) Date of Patent: May 16, 2017

(54) CONNECTIONLESS TRANSPORT FOR USER INPUT CONTROL FOR WIRELESS DISPLAY DEVICES

(71) Applicant: QUALCOMM Incorporated, San Diego, CA (US)

(72) Inventors: Phanikumar Kanakadurga Bhamidipati, San Diego, CA (US); Xiaolong Huang, San Jose, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 14/162,215

(22) Filed: Jan. 23, 2014

(65) Prior Publication Data

US 2014/0210693 A1  Jul. 31, 2014

Related U.S. Application Data

(60) Provisional application No. 61/757,010, filed on Jan. 25, 2013, provisional application No. 61/757,414, filed on Jan. 28, 2013.

(51) Int. Cl.
| | |
|---|---|
| *H04L 12/66* | (2006.01) |
| *G06F 3/14* | (2006.01) |
| *H04L 29/06* | (2006.01) |
| *H04N 21/4363* | (2011.01) |
| *H04N 21/422* | (2011.01) |

(52) U.S. Cl.
CPC ............ *G06F 3/14* (2013.01); *H04L 65/1059* (2013.01); *H04L 65/4084* (2013.01); *H04L 65/4092* (2013.01); *H04L 65/602* (2013.01); *H04L 65/608* (2013.01); *H04N 21/42207* (2013.01); *H04N 21/43637* (2013.01)

(58) Field of Classification Search
CPC .... G06F 3/14; H04L 65/1059; H04L 65/4084
USPC ........................................................ 370/352
See application file for complete search history.

(56) References Cited

U.S. PATENT DOCUMENTS

| | | | | |
|---|---|---|---|---|
| 9,065,876 | B2 * | 6/2015 | Huang | ................. H04L 65/4092 |
| 2002/0112181 | A1 * | 8/2002 | Smith | ................... H04L 63/105 |
| | | | | 726/14 |
| 2002/0161476 | A1 * | 10/2002 | Panofsky | ........... G06Q 20/1235 |
| | | | | 700/231 |

(Continued)

OTHER PUBLICATIONS

Response to Second Written Opinion from International Application No. PCT/2014/012965, dated Mar. 20, 2015, 33 pps.

(Continued)

*Primary Examiner* — Khaled Kassim
*Assistant Examiner* — Berhanu Belete
(74) *Attorney, Agent, or Firm* — Shumaker & Sieffert, P.A.

(57) ABSTRACT

A sink device in a Wireless Display (WD) system may establish a user input device control communication channel between a source device and sink device in a WD system to allow the sink device to send device control inputs to the source device. The user input device control communication channel may include a reverse channel architecture referred to as the Wi-Fi User Input Back Channel (UIBC) that has been modified to transport one or more additional input types over UDP. For example, UIBC may be extended to transport voice input and VNC input types.

40 Claims, 8 Drawing Sheets

(56) References Cited

U.S. PATENT DOCUMENTS

| | | | |
|---|---|---|---|
| 2006/0256721 | A1 | 11/2006 | Yarlagadda et al. |
| 2007/0297426 | A1* | 12/2007 | Haveson ............. H04L 12/2812 370/401 |
| 2008/0059581 | A1* | 3/2008 | Pepperell ............ H04L 12/1827 709/204 |
| 2010/0077055 | A1* | 3/2010 | Cohen ................ H04L 67/1097 709/213 |
| 2010/0250771 | A1* | 9/2010 | Chen ........................ G06F 15/16 709/231 |
| 2011/0032338 | A1* | 2/2011 | Raveendran ......... H04N 21/816 348/51 |
| 2011/0099374 | A1* | 4/2011 | Berrange ................ H04L 63/08 713/168 |
| 2011/0107388 | A1* | 5/2011 | Lee .................... H04N 7/17318 725/118 |
| 2011/0149806 | A1* | 6/2011 | Verma ................ H04L 12/2809 370/255 |
| 2012/0257671 | A1* | 10/2012 | Brockmann ..... H04N 21/64753 375/240.02 |
| 2013/0003623 | A1 | 1/2013 | Raveendran et al. |
| 2013/0013318 | A1* | 1/2013 | Huang ................ G06F 3/1454 704/275 |
| 2013/0246665 | A1* | 9/2013 | Lee ......................... G06F 3/038 710/11 |
| 2013/0304794 | A1* | 11/2013 | Verma ..................... G06F 3/038 709/201 |

OTHER PUBLICATIONS

International Preliminary Report on Patentability from International Application No. PCT/2014/012965, dated May 22, 2015, 10 pp.
"Wi-Fi Display Specification draft version 1.31," Wi-Fi Alliance Technical Committee, Apr. 2011, 326 pp.
International Search Report and Written Opinion from International Application No. PCT/US2014/012965, dated Apr. 25, 2014, 13 pp.
Richardson, et al., "The Remote Framebuffer Protocol; rfc6143.txt", The Remote Framebuffer Protocol; RFC6143.TXT, Internet Engineering Task Force, IETF; Standard, Internet Society (ISOC) 4, Rue Des Falaises CH—1205 Geneva, Switzerland, Mar. 8, 2011, 39 pp.
Wi-Fi Alliance, "Wi-Fi Display Technical Specification Version 1.0.0", Wi-Fi Alliance Specification, Aug. 24, 2012, XP009172467, 149 pp.
Response to Written Opinion dated Apr. 25, 2014 from International Application No. PCT/US2014/012965, filed on Nov. 21, 2014, 7 pp.
Second Written Opinion from International Application No. PCT/US2014/012965, dated Jan. 23, 2015, 8 pp.

\* cited by examiner

CONNECTIONLESS TRANSPORT FOR USER INPUT CONTROL FOR WIRELESS DISPLAY DEVICES

PRIORITY CLAIM

This application claims the benefit of U.S. Provisional Application No. 61/757,010, filed Jan. 25, 2013; and of U.S. Provisional Application No. 61/757,414, filed Jan. 28, 2013; the entire content of each of which being incorporated herein by reference.

TECHNICAL FIELD

The disclosure relates to transport and playback of media data and, more particularly, user input control over the transport and playback of media data.

BACKGROUND

Wi-Fi Display (also known as Miracast™) is an upcoming standard for wireless displays being developed by the Wi-Fi Alliance. The standard is based on Wi-Fi Direct. The Wi-Fi Display (WFD) standard provides an interoperable mechanism to discover, pair, connect and render multimedia content sourced from a Wi-Fi Display Source at a Wi-Fi Display Sink. Additional information regarding the current WFD standard may be found in the Wi-Fi Display Technical Specification v1.0.0, and Wi-Fi Alliance, "Wi-Fi Display Specification draft version 1.31," Wi-Fi Alliance Technical Committee, Display Task Group, which is hereby incorporated by reference in its entirety.

Wireless display (WD) systems include a source device and one or more sink devices. A source device may be a device that is capable of transmitting media content within a wireless local area network. A sink device may be a device that is capable of receiving and rendering media content. The source device and the sink devices may be either mobile devices or wired devices. As mobile devices, for example, the source device and the sink devices may comprise mobile telephones, portable computers with wireless communication cards, personal digital assistants (PDAs), portable media players, digital image capturing devices, such as a camera or camcorder, or other Flash memory devices with wireless communication capabilities, including so-called "smart" phones and "smart" pads or tablets, or other types of wireless communication devices. As wired devices, for example, the source device and the sink devices may comprise televisions, desktop computers, monitors, projectors, printers, audio amplifiers, set top boxes, gaming consoles, routers, vehicle dashboard displays, and digital video disc (DVD) players, and media servers.

A source device may send media data, such as audio video (AV) data, to one or more of the sink devices participating in a particular media share session. The media data may be played back at both a local display of the source device and at each of the displays of the sink devices. More specifically, each of the participating sink devices renders the received media data for presentation on its screen and audio equipment. In some cases, a user of a sink device may apply user inputs to the sink device, such as touch inputs and remote control inputs. In some cases, the source device may use Virtual Network Computing (VNC) as the baseline protocol to display a user interface for source device applications on the sink device displays and to communicate user input back to the mobile source device.

SUMMARY

In general, this disclosure relates to techniques that extend Wireless Display (WD) user input protocols to include additional input types and, in some aspects, to transport user input data corresponding to any of the additional input types using a connectionless transport protocol.

In one example, a method of receiving user input data comprises transmitting a user input back channel (UIBC) parameter message, wherein the UIBC parameter message specifies one of a voice input type and a Virtual Network Computer (VNC) input type, and receiving user input data in a UIBC message according to the specified one of the voice input type and the VNC input type.

In another example, a method of transmitting user input data comprises receiving a user input back channel (UIBC) parameter message, wherein the UIBC parameter message specifies one of a voice input type and a Virtual Network Computer (VNC) input type, and transmitting user input data according to the specified one of the voice input type and the VNC input type.

In another example, a source device comprises means for transmitting a user input back channel (UIBC) parameter message, wherein the UIBC parameter message specifies one of a voice input type and a Virtual Network Computer (VNC) input type, and means for receiving user input data in a UIBC message according to the specified one of the voice input type and the VNC input type.

In another example, a sink device comprises means for receiving a user input back channel (UIBC) parameter message, wherein the UIBC parameter message specifies one of a voice input type and a Virtual Network Computer (VNC) input type, and means for transmitting user input data according to the specified one of the voice input type and the VNC input type.

In another example, a source device comprises one or more processors, wherein the one or more processors are configured to transmit a user input back channel (UIBC) parameter message, wherein the UIBC parameter message specifies one of a voice input type and a Virtual Network Computer (VNC) input type, and receive user input data in a UIBC message according to the specified one of the voice input type and the VNC input type.

In another example, a sink device comprises one or more processors, wherein the one or more processors are configured to receive a user input back channel (UIBC) parameter message, wherein the UIBC parameter message specifies one of a voice input type and a Virtual Network Computer (VNC) input type, and transmit user input data according to the specified one of the voice input type and the VNC input type.

In another example, a computer-readable storage medium comprises instructions stored thereon that, when executed, configure one or more processors to transmit a user input back channel (UIBC) parameter message, wherein the UIBC parameter message specifies one of a voice input type and a Virtual Network Computer (VNC) input type, and receive user input data in a UIBC message according to the specified one of the voice input type and the VNC input type.

In another example, a computer-readable storage medium comprises instructions stored thereon that, when executed, configure one or more processors to receive a user input back channel (UIBC) parameter message, wherein the UIBC parameter message specifies one of a voice input type and a Virtual Network Computer (VNC) input type, and transmit user input data according to the specified one of the voice input type and the VNC input type.

The details of one or more examples of the disclosure are set forth in the accompanying drawings and the description below. Other features, objects, and advantages will be apparent from the description and drawings, and from the claims.

DETAILED DESCRIPTION

A source and a sink device may implement WD communication techniques that are compliant with standards such as, WirelessHD, Wireless Home Digital Interface (WHDI), WiGig, Wireless USB and the Wi-Fi Display (WFD) standard currently under development. Additional information about the WFD standard may be found in Wi-Fi Alliance, "Wi-Fi Display Specification draft version 1.31," Wi-Fi Alliance Technical Committee, Display Task Group, which is hereby incorporated by reference in its entirety. The current WFD standard, however, supports neither voice inputs nor Virtual Network Computing (VNC) inputs, such as the VNC KeyEvent input. In addition, the current WFD standard specifies transporting user input over a connection-oriented protocol, i.e., Transmission Control Protocol over Internet Protocol (TCP/IP).

The techniques of this disclosure may include establishing a user input device control communication channel between a source device and sink device in a WD system to allow the sink device to send device control inputs to the source device. The user input device control communication channel may include a reverse channel architecture referred to as the Wi-Fi User Input Back Channel (UIBC) that has been modified to transport one or more additional input types. For example, UIBC may be extended to transport voice and VNC KeyEvent input types.

In some examples, the techniques may further include modifying the WFD software stack to transport the user input device control communication channel over a connectionless transport protocol, such as User Datagram Protocol over IP (UDP/IP), for one or more of the input types. In some examples, the techniques may include establishing respective user input device control communication channels for TCP/IP and UDP/IP and assigning input types for device control to one of the user input device control communication channels for transport. For instance, voice may be assigned to a UDP/IP channel, while mouse-click events are assigned to TCP/IP. Unlike TCP, UDP provides no guaranteed datagram delivery, ordering, or duplication protection and may be better suited to carrying voice and other real-time data.

As a result, the techniques may extend the range of potential user input types for WD devices and thereby improve a user experience for a user of the sink device who is controlling the operation of the source device. In addition, by modifying the WFD software stack to transport at least some input types of the user input device control communication channel using a connectionless protocol, the techniques may reduce transport latency for user inputs sent by the source device to the sink device, again potentially improving a user experience by decreasing the latency between, for instance, a voice command and command execution.

Figure 1:
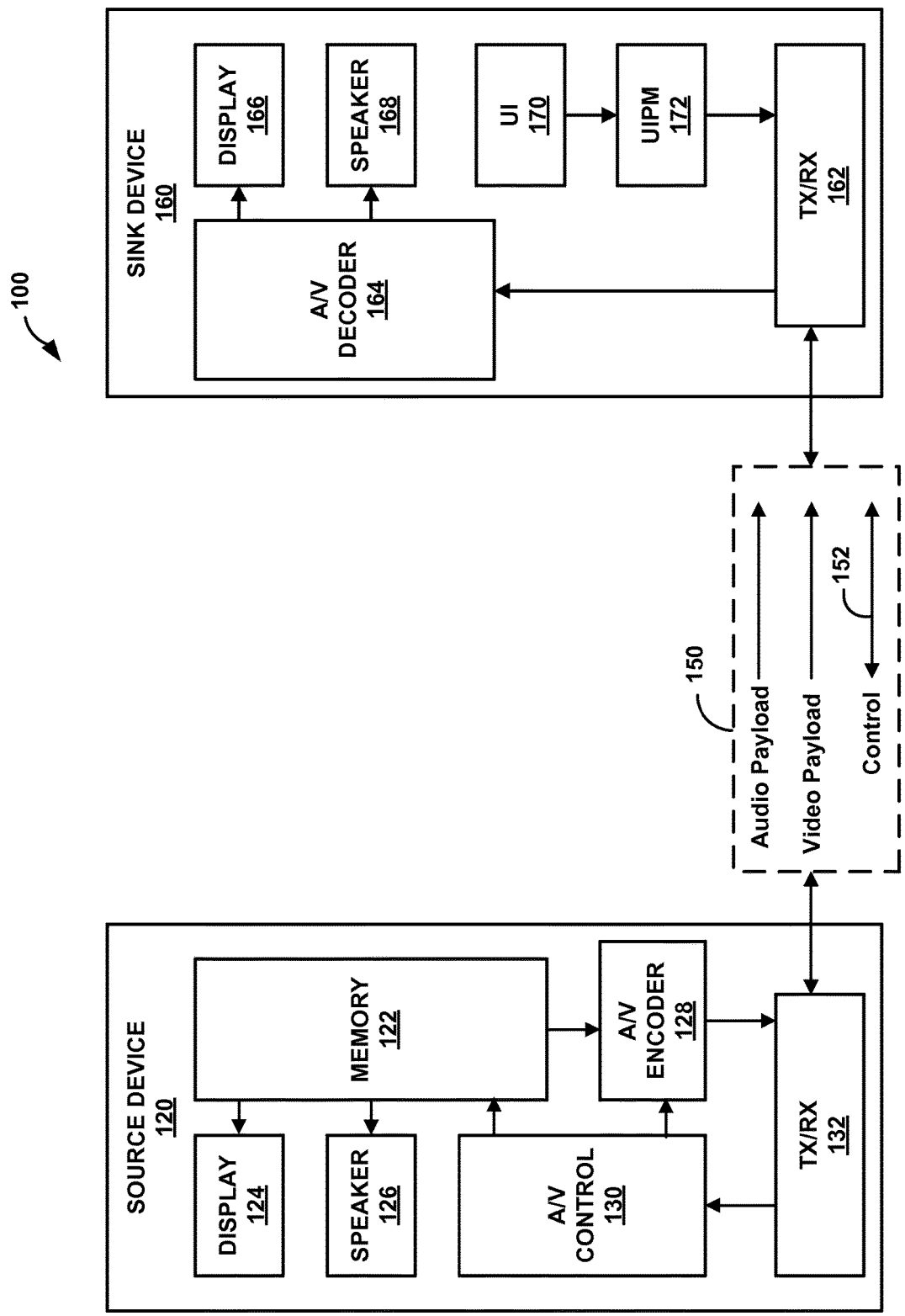
FIG. 1 is a block diagram illustrating an example of a Wireless Display (WD) system including a source device and a sink device capable of exchanging voice and Virtual Network Connection (VNC) KeyEvents using a user input device control communication channel.

FIG. 1 is a block diagram illustrating an example of a Wireless Display (WD) system 100 including a source device 120 and a sink device 160 capable of exchanging voice and Virtual Network Connection (VNC) KeyEvents using a user input device control communication channel. In some examples, source device 120 and sink device 160 are capable of exchanging one or more user input types, such as either or both of the voice and VNC KeyEvent input types, using a connectionless protocol. As shown in FIG. 1, WD system 100 includes source device 120 that communicates with sink device 160 via communication channel 150.

Source device 120 may include a memory 122, display 124, speaker 126, audio and/or video (A/V) encoder 128, audio and/or video (A/V) control module 130, and transmitter/receiver (TX/RX) unit 132. Sink device 160 may include transmitter/receiver unit 162, audio and/or video (A/V) decoder 164, display 166, speaker 168, user input (UI) device 170, and user input processing module (UIPM) 172. The illustrated components constitute merely one example configuration for WD system 100. Other configurations may include fewer components than those illustrated or may include additional components than those illustrated.

In the example of FIG. 1, source device 120 can display the video portion of A/V data on display 124 and can output the audio portion of A/V data using speaker 126. A/V data may be stored locally on memory 122, accessed from an external storage medium such as a file server, hard drive, external memory, Blu-ray disc, DVD, or other physical storage medium, or may be streamed to source device 120 via a network connection such as via the Internet. In some instances, A/V data may be captured in real-time via a camera and microphone of source device 120. A/V data may include multimedia content such as movies, television shows, or music, but may also include real-time content generated by source device 120. Such real-time content may for example be produced by applications running on source device 120, or video data captured, e.g., as part of a video telephony session. Such real-time content may in some instances include a video frame of user input options available for a user to select. In some instances, A/V data may include video frames that are a combination of different types of content, such as a video frame of a movie or TV program that has user input options overlaid on the frame of video. In some instances, A/V data may include data transported by Virtual Network Computing (VNC) to display the user interface of applications executing on source device 120 on the sink device 160. In general, WD may use VNC to display the user interface and to communicate user input from sink device 160 to source device 120.

In addition to (and/or alternatively to) rendering A/V data locally via display 124 and speaker 126, A/V encoder 128 of source device 120 can encode A/V data and transmitter/ receiver unit 132 can transmit the encoded data over communication channel 150 to sink device 160. Transmitter/receiver unit 162 of sink device 160 receives the encoded data, and A/V decoder 164 may decode the encoded data and output the decoded data for presentation on display 166 and speaker 168. In this manner, the audio and video data being rendered by display 124 and speaker 126 can be simultaneously rendered by display 166 and speaker 168. The audio data and video data may be arranged in frames, and the audio frames may be time-synchronized with the video frames when rendered.

A/V encoder 128 and A/V decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, A/V decoder 164 is configured to perform the reciprocal coding operations of A/V encoder 128. Although not shown in FIG. 1, in some aspects, A/V encoder 128 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 128 may also perform other encoding functions in addition to implementing a video compression standard as described above. For example, A/V encoder 128 may add various types of metadata to A/V data prior to A/V data being transmitted to sink device 160. In some instances, A/V data may be stored on or received at source device 120 in an encoded form and thus not require further compression by A/V encoder 128.

Although, FIG. 1 shows communication channel 150 carrying audio payload data and video payload data separately, video payload data and audio payload data may be part of a common data stream. If applicable, MUX-DEMUX units may conform to the ITU H.223 multiplexer protocol, or other protocols such as the user datagram protocol (UDP). A/V encoder 128 and A/V decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of A/V encoder 128 and A/V decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 124 and display 166 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, display 124 and display 168 may each be emissive displays or transmissive displays. Display 124 and display 166 may also be touch displays or presence-sensitive such that they are simultaneously both input devices and display devices. Such touch displays may be capacitive, resistive, or other type of touch or presence-sensitive panel that allows a user to provide user input to the respective device.

Speaker 126 and speaker 168 may comprise any of a variety of audio output devices such as headphones, a single-speaker system, a multi-speaker system, or a surround sound system. Additionally, although display 124 and speaker 126 are shown as part of source device 120 and display 166 and speaker 168 are shown as part of sink device 160, source device 120 and sink device 160 may in fact be a system of devices. As one example, display 166 may be a television, speaker 168 may be a surround sound system, and A/V decoder 164 may be part of an external box connected, either wired or wirelessly, to display 166 and speaker 168. In other instances, sink device 160 may be a single device, such as a tablet computer or smartphone. In still other cases, source device 120 and sink device 160 are similar devices, e.g., both being smartphones, tablet computers, or the like. In this case, one device may operate as the source and the other may operate as the sink. These roles may be reversed in subsequent communication sessions. In still other cases, the source device 120 may comprise a mobile device, such as a smartphone, laptop or tablet computer, and the sink device 160 may comprise a more stationary device (e.g., with an AC power cord), in which case the source device 120 may deliver audio and video data for presentation to a one or more viewers via the sink device 160.

Transmitter/receiver (TX/RX) unit 132 and transmitter/receiver unit 162 may each include various mixers, filters, amplifiers and other components designed for signal modulation, as well as one or more antennas and other components designed for transmitting and receiving data. Communication channel 150 generally represents any suitable communication medium, or collection of different communication media, for transmitting audio/video data, control data and feedback between the source device 120 and the sink device 160. Communication channel 150 is usually a relatively short-range communication channel, and may implement a physical channel structure such as or similar to Wi-Fi, Bluetooth, or the like, such as implementing defined 2.4, GHz, 3.6 GHz, 5 GHz, 60 GHz or Ultrawideband (UWB) frequency band structures. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link.

Source device 120 and sink device 160 may establish a communication session according to a capability negotiation using, for example, Real-Time Streaming Protocol (RTSP) control messages. In one example, a request to establish a communication session may be sent by the source device 120 to the sink device 160. Once the media share session is established, source device 120 transmits media data, e.g., audio video (AV) data, to the participating sink device 160 using the Real-time Transport protocol (RTP). Sink device 160 renders the received media data on its display and audio equipment (not shown in FIG. 1).

Source device 120 and sink device 160 may then communicate over communication channel 150 using a communications protocol such as a standard from the IEEE 802.11 family of standards. In one example communication channel 150 may be a network communication channel. In this example, a communication service provider may centrally operate and administer one or more the network using a base station as a network hub. Source device 120 and sink device 160 may, for example, communicate according to the Wi-Fi Direct or Wi-Fi Display (WFD) standards, such that source device 120 and sink device 160 communicate directly with one another without the use of an intermediary such as wireless access points or so called hotspots. Source device 120 and sink device 160 may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

In addition to decoding and rendering data received from source device 120, sink device 160 can also receive user inputs from user input device 170. User input device 170 may, for example, be a keyboard, mouse, trackball or track pad, touch or presence-sensitive screen, microphone, voice command recognition module, or another user input device. UIPM 172 formats user input commands received by user input device 170 into a data packet structure that source device 120 is capable of processing. Such data packets are transmitted by transmitter/receiver unit 162 to source device 120 over communication channel 150. Transmitter/receiver unit 132 receives the data packets, and A/V control module 130 parses the data packets to interpret the user input command that was received by user input device 170. Based on the command received in the data packet, A/V control module 130 may change the content being encoded and transmitted. In this manner, a user of sink device 160 can control the audio payload data and video payload data being transmitted by source device 120 remotely and without directly interacting with source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a user may be able to leverage the capabilities of one device for use with several devices. For example, source device 120 may comprise a smartphone with a large amount of memory and high-end processing capabilities. When watching a movie, however, the user may wish to watch the movie on a device with a bigger display screen, in which case sink device 160 may be a tablet computer or even larger display device or television. When wanting to send or respond to email, the user may wish to use a device with a physical keyboard, in which case sink device 160 may be a laptop. In both instances, the bulk of the processing may still be performed by source device 120 even though the user is interacting with sink device 160. The source device 120 and the sink device 160 may facilitate two way interactions by transmitting control data, such as data used to negotiate and/or identify the capabilities of the devices in any given session over communication channel 150.

In some configurations, A/V control module 130 may comprise an operating system process or user application being executed by the operating system of source device 120. In other configurations, however, A/V control module 130 may comprise a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

User inputs applied at sink device 160 may be sent back to source device 120 over a user input device control communication channel over communication channel 150. In the illustrated example, the user input device control communication channel is implemented using a reverse channel architecture (referred to herein as the Wi-Fi user interface back channel (UIBC) 152) to enable sink device 160 to transmit the user inputs applied at sink device 160 to source device 120. The reverse channel architecture may include upper layer messages for transporting user inputs, and lower layer frames for negotiating user interface capabilities at sink device 160 and source device 120. UIBC 152 may be transported using a transport layer protocol over the Internet Protocol (IP) network layer between sink device 160 and source device 120. In this manner, UIBC 152 may be above the transport layer in the Open System Interconnection (OSI) communication model and TCP/IP model. To promote reliable transmission and in sequence delivery of data packets containing user input data, UIBC may be configured to run on top of other packet-based communication protocols such as the transmission control protocol/internet protocol (TCP/IP). TCP/IP may enable sink device 160 and source device 120 to implement retransmission techniques in the event of packet loss.

UIBC 152 may be designed to transport various types of user input data, including cross-platform user input data. For example, source device 120 may run the iOS® operating system, while sink device 160 runs another operating system such as Android® or Windows®. Regardless of platform, UIPM 172 may encapsulate received user input in a form understandable to A/V control module 130. A number of different types of user input formats or "input types" may be supported by the UIBC so as to allow many different types of source and sink devices to exploit the protocol regardless of whether the source and sink devices operate on different platforms. Input types for UIBC are assigned to one of two categories: generic and human interface device control (HIDC). In general, generic input types include device-agnostic user inputs processed at the application level, such as mouse up/down, key up/down, touch up/down, zoom, scroll, and rotate. In general, HIDC includes more specialized input types, such as infrared, Universal Serial Bus (USB), Bluetooth, Zigbee, Wi-Fi interfaces, camera, gesture, and so on. The different input types provide flexibility in the manner in which user input can be communicated between source device 120 and sink device 160 by the UIBC.

In accordance with techniques described in this disclosure, UIBC 152 is implemented to transport at least one of a voice type and VNC input types, such as the VNC KeyEvent input type and the VNC PointerEvent input type. A UIBC packet specifying the voice input type transports voice-based media, such as a voice command received by a microphone UI device 170 of sink device 160. A VNC KeyEvent represents a key press or release made with respect to a VNC display displayed by display 166. In one example a VNC KeyEvent message includes message-type, down-flag, padding, and key fields. Other fields may also be used in other examples. The key field identifies the key pressed or released. The down-flag identifies whether the identified by the key field has been pressed or released. A VNC PointerEvent indicates either pointer (e.g., mouse or trackball) movement or a pointer button press or release. A VNC PointerEvent message may include message-type, button-mask, x-position, and y-position fields. Other fields may also be used in other examples. The button-mask field indicates the state of one or more pointer buttons, with the values for different bit positions indicating the corresponding pointer button as being in the down or up state. The pointer is located on the VNC display at (x-position, y-position).

In some examples, the techniques may further include modifying or defining the WFD software stack to transport, at least in part, UIBC 152 over a connectionless transport protocol, such as User Datagram Protocol over IP (UDP/IP). For instance, UIBC 152 may be implemented to run over UDP with respect to the voice input type. In some examples, sink device 160 and source device 120 establish respective user input device control communication channels over TCP/IP and UDP/IP to carry different UIBC input types. For instance, UIBC 152 may transport voice input over a UDP/IP channel, while UIBC 152 transports mouse-clicks over a TCP/IP channel. Unlike TCP, UDP provides no guaranteed datagram delivery, ordering, or duplication protection and may be better suited to carrying voice and other real-time data.

As a result of these techniques, a user of sink device 160 may have more flexibility to control the operation of source device 120 using WD. In addition, in some instances, the techniques may provide a quality user experience for the user by using a connectionless transport protocol for one or more UIBC input types.

Figure 2:
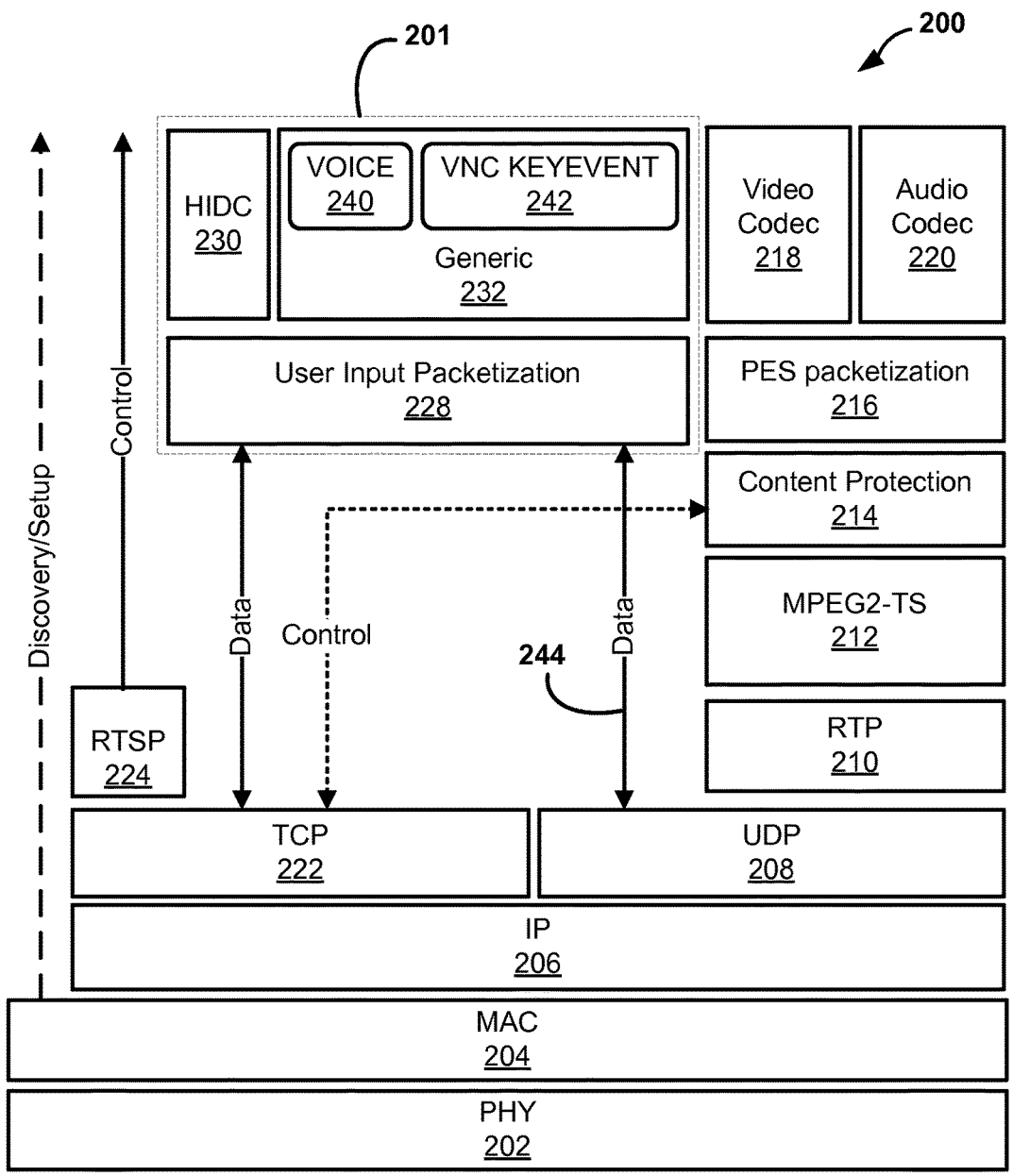
FIG. 2 is a block diagram illustrating an example of a data communication model or protocol stack for a WD system.

FIG. 2 is a block diagram illustrating an example of a data communication model or protocol stack for a WD system. Data communication model 200 illustrates the interactions between data and control protocols used for transmitting data between a source device and a sink device in an implemented WD system. In some examples, WD system 100 may use data communication model 200. Data communication model 200 includes physical (PHY) layer 202, media access control (MAC) layer (204), internet protocol (IP) 206, User Datagram Protocol (UDP) 208, real-time transport protocol (RTP) 210, MPEG2 transport stream (MPEG2-TS) 212, content protection 214, packetized elementary stream (PES) packetization 216, video codec 218, audio codec 220, transport control protocol (TCP) 222, real time streaming protocol (RTSP) 224, user input packetization 228, human interface device commands (HIDC) 230, and generic user inputs 232. User input packetization 228, HIDC 230, and generic user inputs 232 may constitute the User Input Back Channel (UIBC) 201. The UIBC 201 may execute control protocols for implementing UIBC 152 of FIG. 1, for example.

Physical layer 202 and MAC layer 204 may define physical signaling, addressing and channel access control used for communications in a WD system. Physical layer 202 and MAC layer 204 may define the frequency band structure used for communication, e.g., Federal Communications Commission bands defined at 2.4, GHz, 3.6 GHz, 5 GHz, 60 GHz or Ultrawideband (UWB) frequency band structures. Physical layer 202 and MAC 204 may also define data modulation techniques e.g. analog and digital amplitude modulation, frequency modulation, phase modulation techniques, and combinations thereof. Physical layer 202 and MAC 204 may also define multiplexing techniques, e.g. example, time division multi access (TDMA), frequency division multi access (FDMA), code division multi access (CDMA), or any combination of OFDM, FDMA, TDMA and/or CDMA. In one example, physical layer 202 and media access control layer 204 may be defined by a Wi-Fi (e.g., IEEE 802.11-2007 and 802.11n-2009x) standard, such as that provided by WFD. In other examples, physical layer 202 and media access control layer 204 may be defined by any of: WirelessHD, Wireless Home Digital Interface (WHDI), WiGig, and Wireless USB.

Internet protocol (IP) 206, User Datagram Protocol (UDP) 208, real-time transport protocol (RTP) 210, transport control protocol (TCP) 222, and real time streaming protocol (RTSP) 224 define packet structures and encapsulations used in a WD system and may be defined according to the standards maintained by the Internet Engineering Task Force (IETF).

RTSP 224 may be used by source device 120 and sink device 160, for instance, to negotiate capabilities, establish a session, and session maintenance and management. Source device 120 and sink device 160 may establish the feedback channel using an RTSP message transaction to negotiate a capability of source device 120 and sink device 160 to support the feedback channel and feedback input category on the UIBC. The use of RTSP negotiation to establish a feedback channel may be similar to using the RTSP negotiation process to establish a media share session and/or the UIBC.

For example, source device 120 may send a capability request message (e.g., RTSP GET$_{13}$ PARAMETER request message) to sink device 160 specifying a list of capabilities that are of interest to source device 120. In accordance with this disclosure, the capability request message may include the capability to support a feedback channel on the UIBC. Sink device 160 may respond with a capability response message (e.g., RTSP GET_PARAMETER response message) to source device 120 declaring its capability of supporting the feedback channel. As an example, the capability response message may indicate a "yes" if sink device 160 supports the feedback channel on the UIBC. Source device 120 may then send an acknowledgement request message (e.g., RTSP SET_PARAMETER request message) to sink device 160 indicating that the feedback channel will be used during the media share session. Sink device 160 may respond with an acknowledgment response message (e.g., RTSP SET_PARAMETER response message) to source device 120 acknowledging that the feedback channel will be used during the media share session. Capability request, capability response, acknowledgement request, and acknowledgement response messages may be alternatively referred to under the umbrella term "parameter message" or "UIBC parameter message."

Video codec 218 may define the video data coding techniques that may be used by a WD system. Video codec 218 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some instances WD system may either compressed or uncompressed video data.

Audio codec 220 may define the audio data coding techniques that may be used by a WD system. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Packetized elementary stream (PES) packetization 216 and MPEG2 transport stream (MPEG2-TS) 212 may define how coded audio and video data is packetized and transmitted. Packetized elementary stream (PES) packetization 216 and MPEG-TS 212 may be defined according to MPEG-2 Part 1. In other examples, audio and video data may be packetized and transmitted according to other packetization and transport stream protocols. Content protection 214, may provide protection against unauthorized copying of audio or video data. In one example, content protection 214 may be defined according to High bandwidth Digital Content Protection 2.0 specification.

UIBC 201 includes user input packetization 228, which may define how user input is packetized. Human interface device commands (HIDC) 230, generic user inputs 232 may define how types of user inputs are formatted into information elements. For example, human interface device commands 230 and generic user inputs 232 may categorize inputs based on user interface type (e.g., mouse, keyboard, touch, multi-touch, voice, gesture, vendor-specific interface, etc.) and commands (e.g. zoom, pan, etc.) and determine how user inputs should be formatted into information elements. Categorization as either HIDC and generic user input typically affects how subsequent media data is presented to the user at sink device 160, (e.g., zoom and pan operations) and how source device 120 processes (e.g., encodes and/or transmits) the media data to sink device 160.

In one example, human interface device commands 230 may format user input data and generate user input values based on defined user input device specifications such as USB, Bluetooth and Zigbee. Tables 1A, 1B and 1C provide examples of an HIDC input body format, HID Interface Type and HID Type values. In one example, human interface device commands (HIDC) 230 may be defined according to WFD. In Table 1A, the HID Interface Type field specifies a human interface device (HID) type. Examples of HID interface types are provided in Table 1B. The HID Type field specifies a HID type. Table 1C provides examples of HID types. The length field specifies the length of an HIDC value in octets. The HIDC includes input data which may be defined in specifications such as Bluetooth, Zigbee, and USB.

TABLE 1A

HIDC Body Format

| Field | Size (Octet) | Value |
|---|---|---|
| HID Interface Type | 1 | HID Interface Type. See Table 1B |
| HID Type | 1 | HID Type. See Table 1C |
| Length | 2 | Length of HIDC value in octets |

TABLE 1A-continued

HIDC Body Format

| Field | Size (Octet) | Value |
|---|---|---|
| HIDC Value | Variable | HIDC input data which is defined in other specifications such as Bluetooth, Zigbee, and USB. |

TABLE 1B

HIDC Interface Type

| Value | HID Interface Type |
|---|---|
| 0 | Infrared |
| 1 | USB |
| 2 | Bluetooth |
| 3 | Zigbee |
| 4 | Wi-Fi |
| 5-254 | Reserved |
| 255 | Vendor Specific HID interface |

TABLE 1C

HID Type

| Value | HID Type |
|---|---|
| 0 | Keyboard |
| 1 | Mouse |
| 2 | Single Touch |
| 3 | Multi Touch |
| 4 | Joystick |
| 5 | Camera |
| 6 | Gesture |
| 7 | Remote controller |
| 8-254 | Reserved |
| 255 | Vendor specific HID type |

In one example, generic user inputs 232 may be processed at the application level and formatted as information elements independent of a specific user input device. Generic user inputs 232 may be defined by the WFD standard. Tables 2A and 2B provide examples of a generic input body format and input type identifiers for generic user inputs. In Table 2A, the Generic IE ID field specifies a Generic information element (IE) ID type. Examples of Generic IE ID types are provided in Table 2B. The length field specifies the length of a Generic IE ID value in octets. The describe field specifies details of a user input. It should be noted that for the sake of brevity that the details of the user inputs in the describe field in Table 2A have not been described, but in some examples may include X-Y coordinate values for mouse touch/move events, ASCII key codes and control key codes, zoom, scroll, and rotation values. In one example, human interface device commands (HIDC) 230 and generic user inputs 232 may be defined according to WFD.

TABLE 2A

Generic Input Body Format

| Field | Size (Octet) | Value |
|---|---|---|
| Generic IE ID | 1 | Input type, such as Zoom In, Scroll. See Table 2B |

TABLE 2A-continued

Generic Input Body Format

| Field | Size (Octet) | Value |
|---|---|---|
| Length | 2 | Length of the following fields in octets |
| Describe | Variable | The details of user inputs |

TABLE 2B

Generic Input Types

| Generic Input Type ID | Notes |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9-255 | Reserved |

The current WFD standard does not support Voice and VNC KeyEvent inputs. In the illustrated example, generic user inputs 232 corresponding to the generic input category of data communication model 200 is extended to include Voice input 240 and VNC KeyEvent input 242. Example changes to the WFD standard text to effect the above extensions are as follows (other parts not mentioned are as in the WFD standard).

Table 3 provides an example set of input type identifiers for generic user inputs extended to include the Voice and VNC KeyEvent inputs (the underlined syntax is an addition to the Generic Input Type identifiers of the current WFD standard):

TABLE 3

Generic Input Types (extended)

| Generic IE ID | Notes |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9 | Voice |
| 10 | VNC KeyEvent |
| 11-255 | Reserved |

In some examples, Generic Input Type identifiers may include identifiers for, e.g., VNC PointerEvent. Tables 4-5 define newly-added Generic Input Type identifiers according to the following description.

The Describe field of the Generic Input message for the Voice Data Generic Input Type ID is shown in Table 4. Voice inputs are encoded using the negotiated Voice codec. The Voice codec may be negotiated between the WFD Source device and the WFD Sink device in the voice field of the wfd-uibc-capability parameter in RTSP message exchange. The final codec to use may be indicated by the WFD Source in the voice parameter in RTSP M4 and/or M14 request messages. A WFD Sink sends the Voice input over the TCP/UDP transport.

TABLE 4

Describe Field of the Generic Input Message for Voice

| Field | Size (Octet) | Notes |
|---|---|---|
| Voice | Variable | The Audio/Voice data is encoded using the codec negotiated during the UIBC capability negotiation procedure. |

The Describe field of the Generic Input message for the VNC KeyEvent Generic Input Type ID is shown in Table 5:

TABLE 5

Describe Field of the Generic Input Message for VNC KeyEvent

| Field | Size (Octet) | Notes |
|---|---|---|
| VNC KeyEvent | 4 | The VNC 32-bit KeyEvent data. |

The current WFD standard does not support connectionless transport, e.g., UDP transport, for the delivery of UIBC data. The techniques of this disclosure further include adding a UDP transport for UIBC data and utilizing the UDP transport to deliver Voice Data inputs. In the illustrated example, data communication model 200 is modified to optionally execute user input packetization 228 over UDP 208, as indicated by data channel 244. In this way, UIBC data for, e.g., Voice 240 and/or VNC KeyEvent 242 user inputs, may be transported using UDP 208 over IP 206.

Further, additional changes that may be made to the WFD Standard in order to extend the capability negotiation in the WFD Standard to include additional parameters. As illustrated in data communication model 200, a sink device and source device of a WD system may negotiate capabilities using Real-Time Streaming Protocol (RTSP) control messages. According to the WFD Standard, a source device sends an acknowledgement request message (e.g., RTSP SET_PARAMETER request message) to a sink device. The RTSP SET_PARAMETER request message includes parameters indicating how information will be transmitted using the feedback channel during a media share session. In one example, the RTSP SET_PARAMETER request message may be modified to include parameters indicating how VNC inputs will be transmitted using the feedback channel. In one example, the RTSP SET_PARAMETER request message may be modified to include a parameter that indicates how user voice commands will be transmitted using the feedback channel. In one example, the RTSP SET_PARAMETER request message may include a parameter to indicate a User Datagram Protocol (UDP) port for the sink to transmit voice commands. In one example, the SET_PARAMETER request message may be formatted, at least in part, according to the following syntax (the underlined syntax is an addition to the SET_PARAMETER request message of the current WFD standard):

| | |
|---|---|
| wfd-uibc-capability | = "wfd_uibc_capability:" SP ("none" / (input-category-val ";" generic-cap-val ";" hidc-cap-val ";" tcp-port ";" udp-port)) CRLF; "none" if not supported |
| input-category-val | = "input_category_list=" ("none" / input-category-list) |
| input-category-list | = input-cat * ("," SP input-category-list) |
| input-cat | = "GENERIC" / "HIDC" |
| generic-cap-val | = "generic_cap_list=" ("none" / generic-cap-list) |
| generic-cap-list | = inp-type *("," SP generic-cap-list) |

-continued

| | |
|---|---|
| inp-type | = "Keyboard" / "Mouse" / "SingleTouch" / "MultiTouch" / "Joystick" / "Camera" / "Gesture" / "RemoteControl" / voice / "VNCKeyEvent" |
| hidc-cap-val | = "hidc_cap_list=" ("none" / hidc-cap-list) |
| hidc-cap-list | = detailed-cap *("," SP hidc-cap-list) |
| detailed-cap | = inp-type "/" inp-path |
| inp-path | = "Infrared" / "USB" / "BT" / "Zigbee" / "Wi-Fi" / "No-SP" |
| tcp-port | = "port=" ("none" / IPPORT) |
| udp-port | = "udp port=" ("none" / IPPORT) |
| voice | = "voice command = {" uibc-voip-codec-list SP "}" |
| uibc voip codec list | = uibc-voip-codec-combo * (SPuibc-voip-codec-list) |
| uibc voip codec combo | = uibc-voip-codec ":" uibc-voip-mode |
| uibc voip codec | = "LPCM" / "AMR" / "AMR WB" / QCELP" |
| uibc voip mode | = 8*8HEXDIG; see Table 5.21 for LPCM modes, Table 6.x for AMR and other codecs |

The wfd-uibc-capability parameter describes support for the user input back channel (UIBC) and related attributes. Support for UIBC is indicated using the UIBC Support bit (BO) of the WFD Extended Capability bitmap in the WFD Extended Capability sub-element. Note that "none" indicates that the corresponding sub-parameter value is not supported.

The WFD Source indicates the TCP port number to be used for UIBC in the tcp-port field of the wfd-uibc-capability parameter in RTSP M4 and/or M14 request messages. The WFD Sink uses "none" for the tcp-port field of the wfd-uibc-capability parameter in RTSP M3 response and M14 request messages.

The WFD Source indicates the UDP port number to be used for UIBC in the udp-port field of the wfd-uibc-capability parameter in RTSP M4 and/or M14 request messages. The WFD Sink uses "none" for the udp-port field of the wfd-uibc-capability parameter in RTSP M3 response and M14 request messages. In addition, the WFD Sink may use "none" for the udp-port field of the wfd-uibc-capability parameter for VNC input types, such as VNCKeyEvent or VNCPointerEvent, for VNC input data transmission may in some instances require a TCP connection. The voice input data may be transported to the UDP port negotiated during the UIBC capability negotiation procedure, in accordance with techniques described in this disclosure.

In some examples, the techniques may include adding support for voice inputs via an additional Audio Back Channel while adding the support for VNC inputs via the Generic Input Category over Wi-Fi Display UIBC. The additional Audio Back Channel may provide RTP/UDP transport for delivery Voice and microphone inputs from a WFD Sink (e.g., sink device 160 of FIG. 1) to a WFD Source (e.g., source device 120 of FIG. 1). In such examples, the Generic Input Type ID table for User Inputs of the Generic Category may be as follows:

TABLE 6

Generic Input Types (extended)

| Generic IE ID | Notes |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |

TABLE 6-continued

Generic Input Types (extended)

| Generic IE ID | Notes |
|---|---|
| 6 | Vertical Scroll |
| 7 | Horizontal Scroll |
| 8 | Rotate |
| 9 | VNC KeyEvent |
| 11-255 | Reserved |

The Describe field of the Generic Input message for the VNC KeyEvent Generic Input Type ID for Table 6 is described in Table 5.

The Audio Back Channel (ABC) is an optional WFD feature that when implemented facilitates communication of audio/voice inputs to a User, present at the WFD Source, from the WFD Sink. ABC inputs may be encapsulated by RTP/UDP/IP headers prior to 802.11 packetization and transmission to the WFD Source. The ABC Audio packets are packetized using RTP, UDP and IP headers. An RTP packet that includes ABC Audio packets may include a 32-bit RTP time-stamp (RTP TS) information that is derived from the master-clock maintained by the WFD Source and is represented in 90 kHz units where one tick corresponds to 11.11 μs. The RTP TS for a WFD packet may be set to map to the time of arrival of the first ABC packet at the RTP encapsulation layer. The audio input payload may use a mandatory format, i.e., (Linear Pulse Code Modulated Audio (LPCM), 16 bits, 48 kbps and 2ch and the audio payload may carry either actual audio data or null data.

Again, in examples of the techniques in which an additional Audio Back Channel provides support for voice inputs, additional changes that may be made to the WFD Standard in order to extend the capability negotiation in the WFD Standard to include additional parameters. As illustrated in data communication model 200, a sink device and source device of a WD system may negotiate capabilities using Real-Time Streaming Protocol (RTSP) control messages. According to the WFD Standard, a source device sends an acknowledgement request message (e.g., RTSP SET_PARAMETER request message) to a sink device. The RTSP SET_PARAMETER request message includes parameters indicating how information will be transmitted using the feedback channel during a media share session. In one example, the SET_PARAMETER request message may be formatted, at least in part, according to the following syntax (the underlined syntax is an addition to the SET_PARAMETER request message of the current WFD standard):

| | |
|---|---|
| wfd-uibc-capability | = "wfd_uibc_capability:" SP ("none" / (input-category-val ";" generic-cap-val ";" hidc-cap-val ";" tcp-port)) CRLF; "none" if not supported |
| input-category-val | = "input_category_list=" ("none" / input-category-list) |
| input-category-list | = input-cat * ("," SP input-category-list) |
| input-cat | = "GENERIC" / "HIDC" |
| generic-cap-val | = "generic_cap_list=" ("none" / generic-cap-list) |
| generic-cap-list | = inp-type *("," SP generic-cap-list) |
| inp-type | = "Keyboard" / "Mouse" / "SingleTouch" / "MultiTouch" / "Joystick" / "Camera" / "Gesture" / "RemoteControl" / "VNCKeyEvent" |
| hidc-cap-val | = "hidc_cap_list=" ("none" / hidc-cap-list) |
| hidc-cap-list | = detailed-cap *("," SP hidc-cap-list) |
| detailed-cap | = inp-type "/" inp-path |
| inp-path | = "Infrared" / "USB" / "BT" / "Zigbee" / "Wi-Fi" / "No-SP" |
| tcp-port | = "port=" ("none" / IPPORT) |

The wfd-uibc-capability parameter describes support for the user input back channel (UIBC) and related attributes. Support for UIBC is indicated using the UIBC Support bit (B0) of the WFD Extended Capability bitmap in the WFD Extended Capability sub-element. Note that "none" indicates that the corresponding sub-parameter value is not supported.

The WFD Extended Capability bitmap may be further modified to describe support for the Audio Back Channel according to techniques described herein. In some examples, the WFD Extended Capability bitmap may be modified as follows:

TABLE 7

WFD Extended Capabilities Bitmap (extended)

| Bits | Name | Interpretation |
| --- | --- | --- |
| 0 | UIBC Support bit | 0b0: Not supported<br>0b1: Supported |
| 1 | I2C Read/Write Support bit | 0b0: Not supported<br>0b1: Supported |
| 2 | Preferred Display mode Support bit | 0b0: Not supported<br>0b1: Supported |
| 3 | Standby and Resume Control Support bit | 0b0: Not supported<br>0b1: Supported |
| 4 | TDLS Persistent Support bit | 0b0: Not supported<br>0b1: Supported |
| 5 | TDLS Persistent BSSID Support bit | 0b0: Not supported<br>0b1: Supported |
| 6 | ABC Support Bit | 0b0: Not supported<br>0b1: Supported |
| 15:7 | Reserved | Set to all zeros |

The wfd-abc-capability parameter describes support for the Audio Back Channel (ABC) and related attributes. Support for ABC is indicated using the ABC Support bit of the WFD Extended Capability bitmap in the WFD Extended Capability subelement, as described above. An example of a new wfd-abc-capability parameter for RTSP exchange to support voice inputs is as follows:

```
wfd-abc-capability   = "wfd_abc_capability:"
                       SP abc-cap SP abc-port CRLF
abc-cap              = "none" / ("abc_cap=" abc-audio-list);
abc-audio-list       = audio-format SP modes SP latency *("," SP abc-
                       audio-list)
audio-format         = "LPCM" / "AAC" / "AC3"
modes                = 8*8HEXDIG;
latency              = 2*2HEXDIG;
abc-port             = "udp_port=" ("none" / IPPORT)
```

The abc-audio-list represents a list of one or more <audio-format, modes, latency> tuples for each audio CODEC supported. The WFD Source may indicate the UDP port number to be used for ABC in the udp-port field of the wfd-abc-capability parameter in RTSP M4 request messages. The WFD Sink may use "none" for the udp-port field of the wfd-abc-capability parameter in RTSP M3 response messages.

Figure 3:
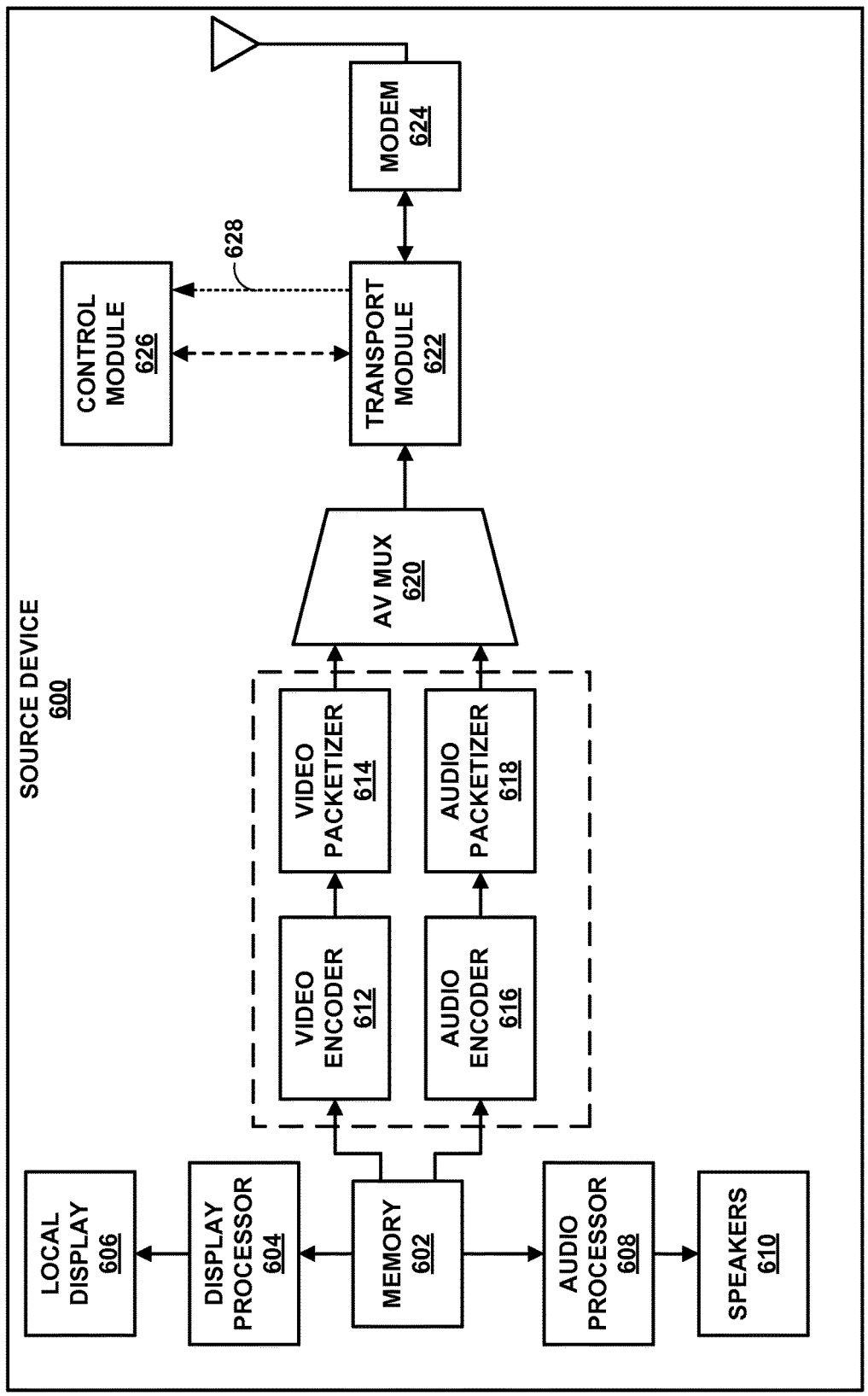
FIG. 3 is a block diagram illustrating an example of a source device that may implement techniques described herein.

FIG. 3 is a block diagram illustrating an example of a source device that may implement techniques described herein. Source device 600 may be part of a WD system that incorporates the data communication model provided in FIG. 2. Source device 600 may be configured to encode and/or decode media data for transport, storage, and/or display. Source device 600 includes memory 602, display processor 604, local display 606, audio processor 608, speakers 610, video encoder 612, video packetizer 614, audio encoder 616, audio packetizer 618, A/V mux 620, transport module 622, modem 624, and control module 626. The components of source device 600 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Memory 602 may store A/V visual data in the form of media data in compressed or uncompressed formats. Memory 602 may store an entire media data file, or may comprise a smaller buffer that simply stores a portion of a media data file, e.g., streamed from another device or source. Memory 602 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 602 may comprise a computer-readable storage medium for storing media data, as well as other kinds of data. Memory 602 may additionally store instructions and program code that are executed by a processor as part of performing the various techniques described in this disclosure.

Display processor 604 may obtain captured video frames and may process video data for display on local display 606. Display 606 comprise one of a variety of display devices such as a liquid crystal display (LCD), a plasma display, an organic light emitting diode (OLED) display, or another type of display device capable of presenting video data to a user of source device 600.

Audio processor 608 may obtain audio captured audio samples and may process audio data for output to speakers 610. Speakers 610 may comprise any of a variety of audio output devices such as headphones, a single-speaker system, a multi-speaker system, or a surround sound system.

Video encoder 612 may obtain video data from memory 602 and encode video data to a desired video format. Video encoder 612 may be a combination of hardware and software used to implement aspects of video codec 218 described above with respect to FIG. 2. Video encoder 612 may encode the video according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some cases video encoder 612 may encode video such that video data is compressed using a lossless or lossy compression technique.

Video packetizer 614 may packetize encoded video data. In one example video packetizer 614 may packetize encoded video data as defined according to MPEG-2 Part 1. In other examples, video data may be packetized according to other packetization protocols. Video packetizer 614 may be a combination of hardware and software used to implement aspects of packetized elementary stream (PES) packetization 216 described above with respect to FIG. 2.

Audio encoder 616 may obtain audio data from memory 602 and encode audio data to a desired audio format. Audio encoder 616 may be a combination of hardware and software used to implement aspects of audio codec 220 described above with respect to FIG. 2. Audio data may be coded using multi-channel formats such those developed by Dolby and Digital Theater Systems. Audio data may be coded using a compressed or uncompressed format. Examples of compressed audio formats include MPEG-1, 2

Audio Layers II and III, AC-3, AAC. An example of an uncompressed audio format includes pulse-code modulation (PCM) audio format.

Audio packetizer 618 may packetize encoded audio data. In one example, audio packetizer 618 may packetize encoded audio data as defined according to MPEG-2 Part 1. In other examples, audio data may be packetized according to other packetization protocols. Audio packetizer 618 may be a combination of hardware and software used to implement aspects of packetized elementary stream (PES) packetization 216 described above with respect to FIG. 2.

A/V mux 620 may apply multiplexing techniques to combine video payload data and audio payload data as part of a common data stream. In one example, A/V mux 620 may encapsulate packetized elementary video and audio streams as an MPEG2 transport stream defined according to MPEG-2 Part 1. A/V mux 620 may provide synchronization for audio and video packets, as well as error correction techniques.

Transport module 622 may process media data for transport to a sink device. Further, transport module 622 may process received packets from a sink device so that they may be further processed. For example, transport module 622 may be configured to communicate using IP, TCP, UDP, RTP, and RSTP. For example, transport module 622 may further encapsulate an MPEG2-TS for communication to a sink device or across a network.

Modem 624 may be configured to perform physical and MAC layer processing according to the physical and MAC layers utilized in a WD system. As described with reference to FIG. 2. Physical and MAC layers may define physical signaling, addressing and channel access control used for communications in a WD system. In one example, modem 624 may configured to perform physical layer and MAC layer processing for physical and MAC layers defined by a Wi-Fi (e.g., IEEE 802.11x) standard, such as that provided by WFD. In other examples, modem 624 may configured to perform physical layer and MAC layer processing for any of: WirelessHD, WiMedia, Wireless Home Digital Interface (WHDI), WiGig, and Wireless USB.

Control module 626 may be configured to perform source device 600 communication control functions. Communication control functions may relate to negotiating capabilities with a sink device, establishing a session with a sink device, and session maintenance and management. Control module 626 may use RTSP to communicate with a sink device. Further, control module 626 may establish one or more communication channels using RTSP message transactions to negotiate a capability of source device 600 and a sink device to support transport of UIBC over UDP and to support additional generic user input types.

Transport module 622 may receive and send UIBC information elements (IE) to control module 626. In the illustrated example, transport module 622 receives UIBC IE 628 and sends the UIBC IE 628 to control module 626. Control module 626 parses UIBC IE 628 to identify the user input and modifies the operation of any of components 606, 604, 602, 608, 610, 612, 614, 616, 618, or 620 accordingly.

Figure 4:
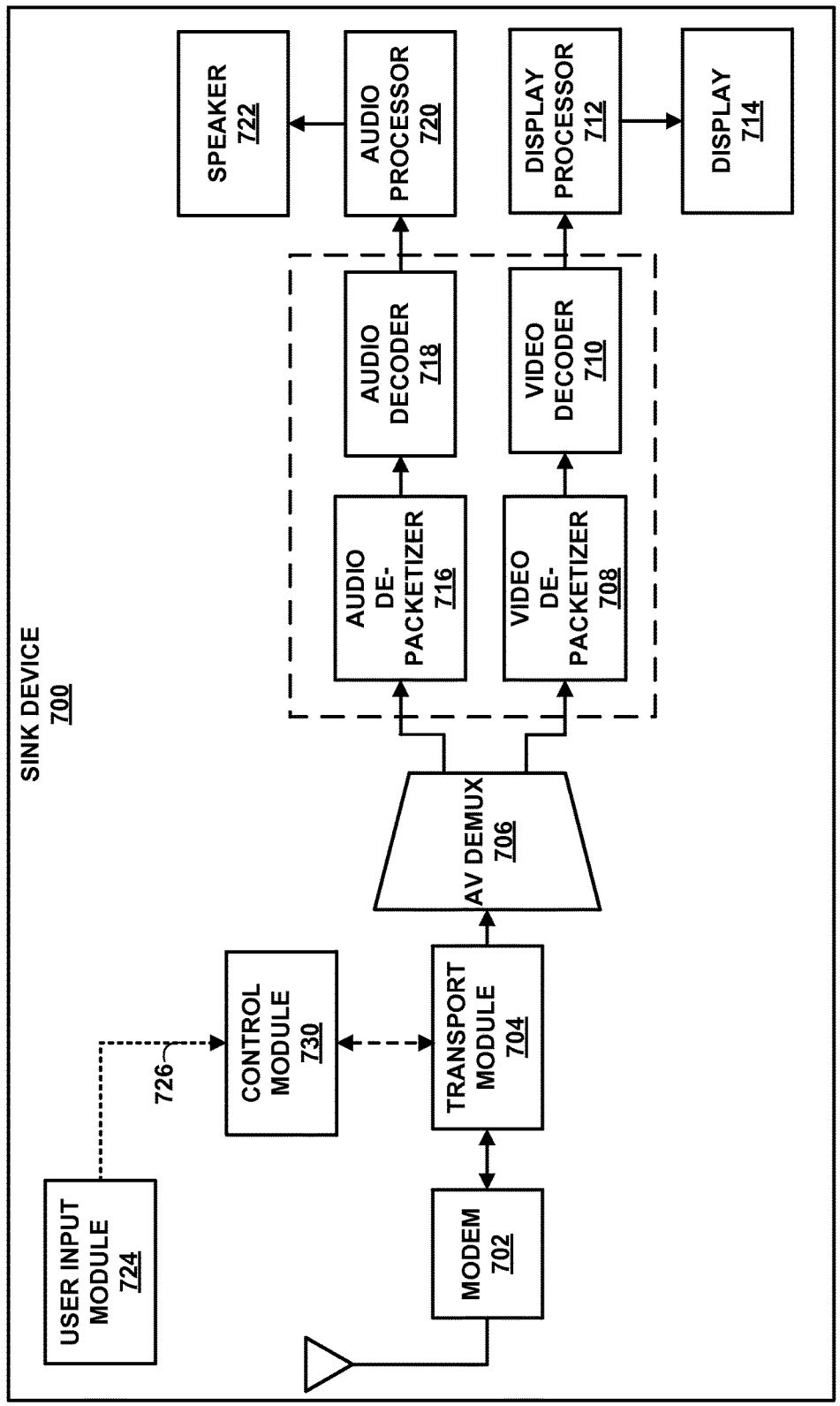
FIG. 4 is a block diagram illustrating an example of a sink device that that may implement techniques described herein.

FIG. 4 is a block diagram illustrating an example of a sink device that that may implement techniques described herein. Sink device 700 may be part of a WD system that incorporates the data communication model provided in FIG. 2. In one example, Sink device 700 may form a WD system with source device 600. Sink Device 700 includes modem 702, transport module 704, A/V demux 706, video de-packetizer 708, video decoder 710, display processor 712, display 714, audio depacketizer 716, audio decoder 718, audio processor 720, speaker 722, user input module 724, and control module 730. The components of sink device 700 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Modem 702, may be configured to perform physical and MAC layer processing according to the physical and MAC layers utilized in a WD system. As described with reference to FIG. 2. Physical and MAC layers may define physical signaling, addressing and channel access control used for communications in a WD system. In one example, modem 702 may configured to perform physical layer and MAC layer processing for physical and MAC layers defined by a Wi-Fi (e.g., IEEE 802.11x) standard, such as that provided by WFD. In other examples, modem 702 may configured to perform physical layer and MAC layer processing for any of: WirelessHD, WiMedia, Wireless Home Digital Interface (WHDI), WiGig, and Wireless USB.

Transport module 704, may process received media data from a source device. Further, transport module 704 may process feedback packets for transport to a source device. For example, transport module 704 may be configured to communicate using IP, TCP, UDP, RTP, and RSTP. In addition, transport module 704 may include a timestamp value in any combination of IP, TCP, UDP, RTP, and RSTP packets. The timestamp values may enable a source device to identify which media data packet experienced a reported performance degradation and to calculate the roundtrip delay in a WD system.

A/V demux 706, may apply de-multiplexing techniques to separate video payload data and audio payload data from data stream. In one example, A/V mux 706 may separate packetized elementary video and audio streams of an MPEG2 transport stream defined according to MPEG-2 Part 1.

Video de-packetizer 708 and Video decoder 710 may perform reciprocal processing of a video packetizer and a video encoder implementing packetization and coding techniques described herein and output video output video data to display processor 712.

Display processor 712 may obtain captured video frames and may process video data for display on display 714. Display 714 may comprise one of a variety of display devices such as a liquid crystal display (LCD), a plasma display, an organic light emitting diode (OLED) display, or another type of display.

Audio de-packetizer 716 and audio decoder 718 may perform reciprocal processing of an audio packetizer and audio encoder implementing packetization and coding techniques described herein and output audio data to audio processor 720

Audio processor 720 may obtain audio data from audio decoder and may process audio data for output to speakers 722. Speakers 722 may comprise any of a variety of audio output devices such as headphones, a single-speaker system, a multi-speaker system, or a surround sound system.

User input module 724 may format user input commands received by user input device such as, for example, a keyboard, mouse, trackball or track pad, touch screen, voice command recognition module, or any other such user input device. In one example user input module 724 may format user input commands according formats defined according to human interface device commands (HIDC) 230 and generic user inputs 232 described above with respect to FIG. 2. In the illustrated example, user input module 724 receives voice input from an voice-based input device (not shown) and formats the voice input according to a UIBC IE that specifies voice data, as described above with respect to FIG. 2. User input module 724 sends the formatted UIBC IE 726 to control module 730 for output by modem 702.

Control module 730 may be configured to perform sink device 700 communication control functions. Communication control functions may relate to negotiating capabilities with a source device, establishing a session with a source device, and session maintenance and management. Control module 730 may use RTSP to communication with a source device. Further, control module 730 may establish a feedback channel using an RTSP message transaction to negotiate a capability of sink device 700 and a source device to support techniques described in this disclosure.

Figure 5:
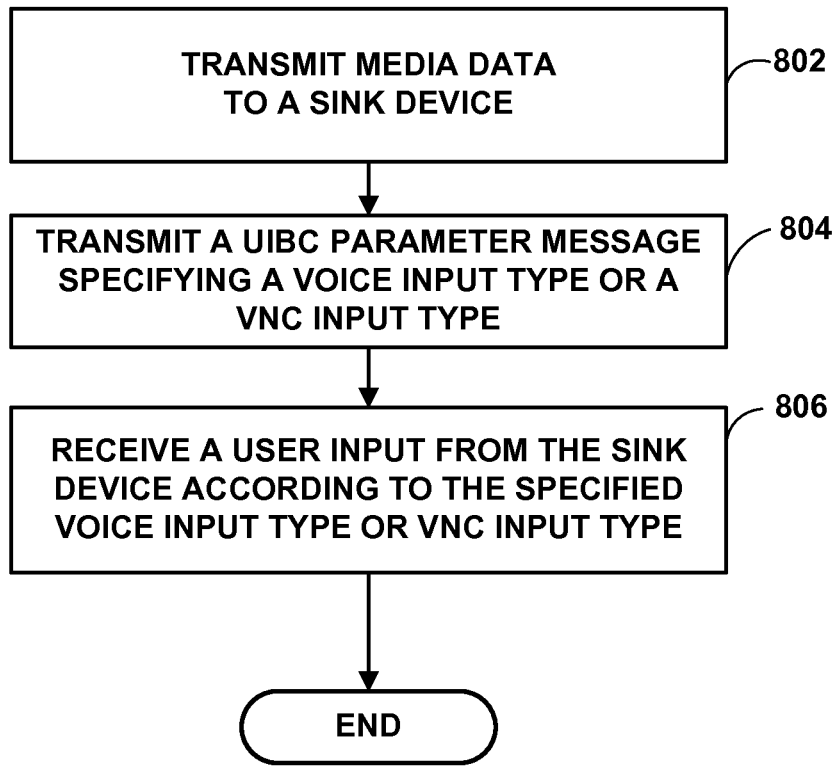
FIG. 5 is a flowchart illustrating a user input transmission technique described herein.

FIG. 5 is a flowchart illustrating a user input transmission technique described herein. A source device transmits media data to a sink device. Source device and sink device may be any combination of source and sink devices described herein (802). In one example, media data may be transmitted according to UDP. The source device transmits a UIBC parameter message that specifies capabilities for a UIBC, including one or more of a voice input type or Virtual Network Computing (VNC) input type, and may be formatted according any message format described herein (804). The source device may further receive, from the sink device, a UIBC message that includes user input that accords with UIBC capabilities, including the specified voice input type or VNC input type (806).

Figure 6:
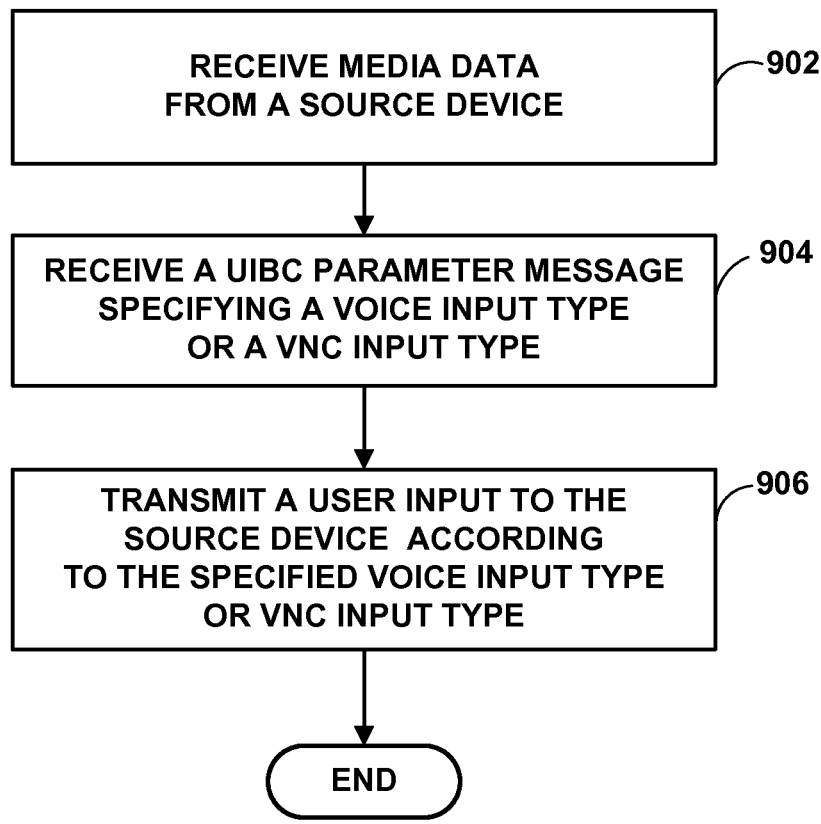
FIG. 6 is a flowchart illustrating a user input transmission technique described herein.

FIG. 6 is a flowchart illustrating a user input transmission technique described herein. A sink device receives media data from a source device (902). Source device and sink device may be any combination of source and sink devices described herein. In one example, media data may be received according to UDP. The sink device receives a UIBC parameter message that specifies capabilities for a UIBC, including one or more of a voice input type or VNC input type, and may be formatted according any message format described herein (904). The sink device may further transmit, to the source device, a UIBC message that includes user input that accords with UIBC capabilities, including the specified voice input type or VNC input type (906).

Figure 7:
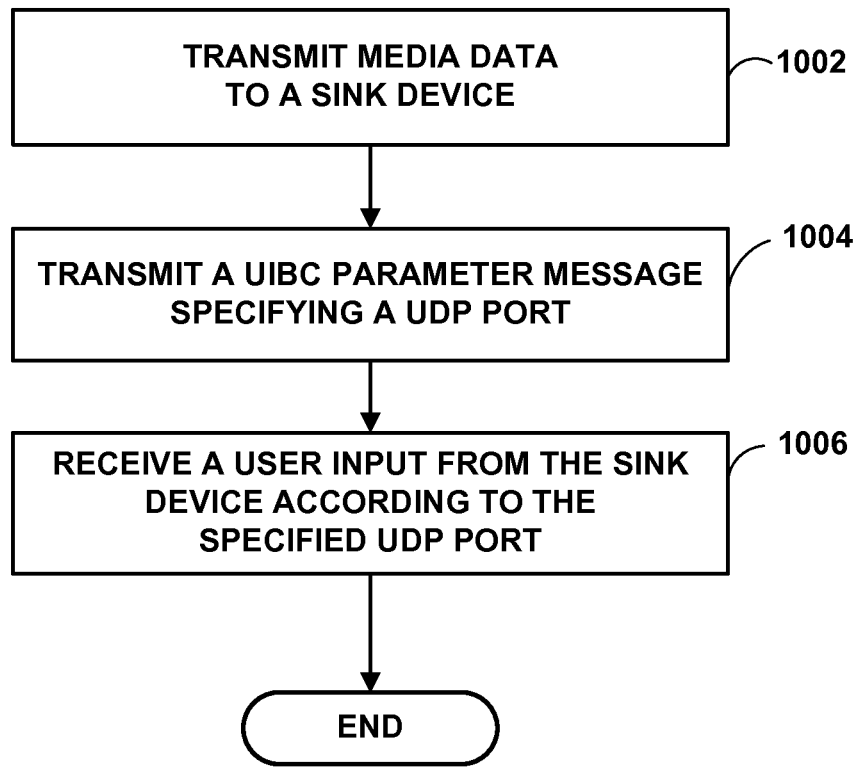
FIG. 7 is a flowchart illustrating a user input transmission technique described herein.

FIG. 7 is a flowchart illustrating a user input transmission technique described herein. A source device transmits media data to a sink device. Source device and sink device may be any combination of source and sink devices described herein (1002). In one example, media data may be transmitted according to UDP. The source device transmits a UIBC parameter message that specifies capabilities for a UIBC, including a User Datagram Protocol (UDP) port (for voice input data, e.g.), and may be formatted according any message format described herein (1004). The source device may further receive, from the sink device, a UIBC message, which may include voice input data, at the specified UDP port (1006).

Figure 8:
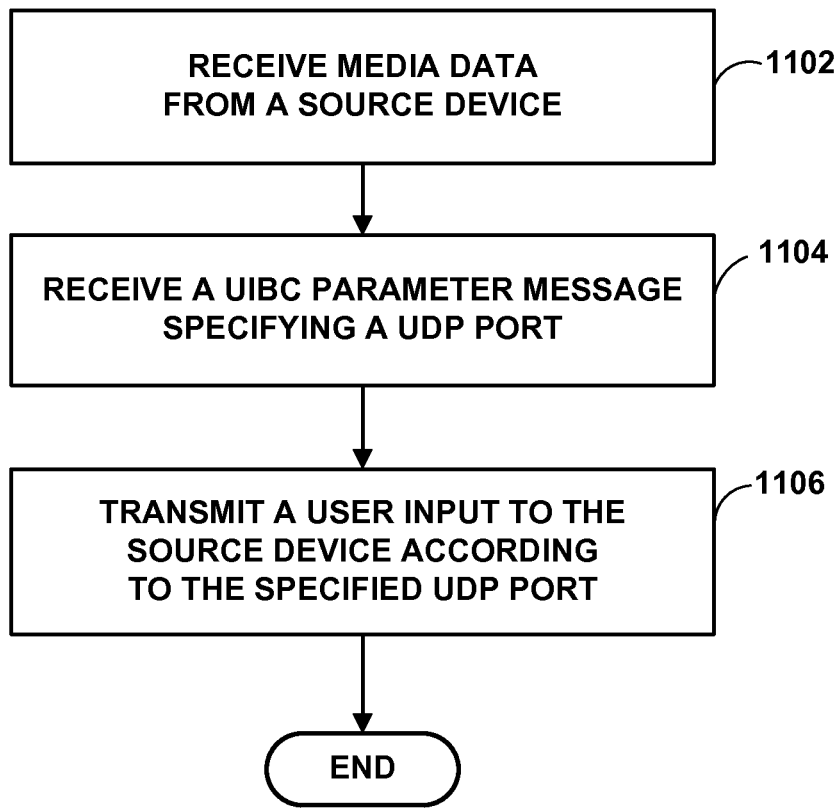
FIG. 8 is a flowchart illustrating a user input transmission technique described herein.

FIG. 8 is a flowchart illustrating a user input transmission technique described herein. A sink device receives media data from a source device (1102). Source device and sink device may be any combination of source and sink devices described herein. In one example, media data may be received according to UDP. The sink device receives a UIBC parameter message that specifies capabilities for a UIBC, including a User Datagram Protocol (UDP) port (for voice input data, e.g.), and may be formatted according any message format described herein (1104). The sink device may further transmit, to the source device, a UIBC message, which may include voice input data received by the sink device, using the specified UDP port (1106). For example, a UDP datagram that includes the UIBC message may include a destination port that is the specified UDP port.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of receiving user input data, the method comprising:
   transmitting a user input back channel (UIBC) parameter message, wherein the UIBC parameter message specifies a Virtual Network Computing (VNC) input type; and
   receiving user input data in a UIBC message according to the specified VNC input type, wherein the UIBC message includes a Generic Input Message comprising a Generic Input Type identifier field that specifies the VNC input type and a Describe field that includes:
  VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
  VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

2. The method of claim 1, wherein the VNC input type is one of a VNC KeyEvent input type and a VNC PointerEvent input type.

3. The method of claim 1, wherein the UIBC parameter message comprises a Real-Time Streaming Protocol (RTSP) SET_PARAMETER request message.

4. The method of claim 1,
  wherein the UIBC parameter message comprises a Real-Time Streaming Protocol (RTSP) control message that identifies a User Datagram Protocol (UDP) port, and
  wherein receiving the user input data comprises receiving the user input data using the identified UDP port.

5. The method of claim 1, wherein the user input back channel (UIBC) parameter message conforms to a Wi-Fi Display (WFD) standard, the method further comprising:
  establishing a connection using a communications protocol based on the WFD standard.

6. A method of transmitting user input data, the method comprising:
  receiving a user input back channel (UIBC) parameter message, wherein the UIBC parameter message specifies a Virtual Network Computing (VNC) input type; and
  transmitting user input data according to the specified the VNC input type,
  wherein the UIBC message includes a Generic Input Message comprising a Generic Input Type identifier field that specifies the VNC input type and a Describe field that includes:
    VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
    VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

7. The method of claim 6, wherein the VNC input type is one of a VNC KeyEvent input type and a VNC PointerEvent input type.

8. The method of claim 6, wherein the UIBC parameter message comprises a Real-Time Streaming Protocol (RTSP) SET_PARAMETER request message.

9. The method of claim 6,
  wherein the UIBC parameter message comprises a Real-Time Streaming Protocol (RTSP) control message that identifies a User Datagram Protocol (UDP) port, and
  wherein transmitting the user input data comprises transmitting the user input data using the identified UDP port.

10. The method of claim 6, wherein the user input back channel (UIBC) parameter message conforms to a Wi-Fi Display (WFD) standard, the method further comprising:
  establishing a connection using a communications protocol based on the WFD standard.

11. A source device comprising:
  a processor;
  means for transmitting a user input back channel (UIBC) parameter message, wherein the UIBC parameter message specifies a Virtual Network Computing (VNC) input type; and
  means for receiving user input data in a UIBC message according to the specified VNC input type,
  wherein the UIBC message includes a Generic Input Message comprising a Generic Input Type identifier field that specifies the VNC input type and a Describe field that includes:
    VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
    VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

12. The source device of claim 11, wherein the VNC input type is one of a VNC KeyEvent input type and a VNC PointerEvent input type.

13. The source device of claim 11, wherein the UIBC parameter message comprises a Real-Time Streaming Protocol (RTSP) SET_PARAMETER request message.

14. The source device of claim 11,
  wherein the UIBC parameter message comprises a Real-Time Streaming Protocol (RTSP) control message that identifies a User Datagram Protocol (UDP) port, and
  wherein the means for receiving the user input data comprises means for receiving the user input data using the identified UDP port.

15. The source device of claim 11, wherein the user input back channel (UIBC) parameter message conforms to a Wi-Fi Display (WFD) standard, and further comprising:

means for establishing a connection using a communications protocol based on the WFD standard.

16. A sink device comprising: a processor;
means for receiving a user input back channel (UIBC) parameter message, wherein the UIBC parameter message specifies a Virtual Network Computing (VNC) input type; and
means for transmitting user input data according to the specified VNC input type,
wherein the UIBC message includes a Generic Input Message comprising a Generic Input Type identifier field that specifies the VNC input type and a Describe field that includes:
VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

17. The sink device of claim 16, wherein the VNC input type is one of a VNC KeyEvent input type and a VNC PointerEvent input type.

18. The sink device of claim 16, wherein the UIBC parameter message comprises a Real-Time Streaming Protocol (RTSP) SET_PARAMETER request message.

19. The sink device of claim 16,
wherein the UIBC parameter message comprises a Real-Time Streaming Protocol (RTSP) control message that identifies a User Datagram Protocol (UDP) port, and
wherein the means for transmitting the user input data comprises means for transmitting the user input data using the identified UDP port.

20. The sink device of claim 16, wherein the user input back channel (UIBC) parameter message conforms to a Wi-Fi Display (WFD) standard, and further comprising:
means for establishing a connection using a communications protocol based on the WFD standard.

21. A source device comprising one or more processors, wherein the one or more processors are configured to:
transmit a user input back channel (UIBC) parameter message, wherein the UIBC parameter message specifies a Virtual Network Computing (VNC) input type; and
receive user input data in a UIBC message according to the specified VNC input type,
wherein the UIBC message includes a Generic Input Message comprising a Generic Input Type identifier field that specifies the VNC input type and a Describe field that includes:
VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

22. The source device of claim 21, wherein the VNC input type is one of a VNC KeyEvent input type and a VNC PointerEvent input type.

23. The source device of claim 21, wherein the UIBC parameter message comprises a Real-Time Streaming Protocol (RTSP) SET_PARAMETER request message.

24. The source device of claim 21,
wherein the UIBC parameter message comprises a Real-Time Streaming Protocol (RTSP) control message that identifies a User Datagram Protocol (UDP) port, and
wherein to receive the user input data the processors are further configured to receive the user input data using the identified UDP port.

25. The source device of claim 21,
wherein the user input back channel (UIBC) parameter message conforms to a Wi-Fi Display (WFD) standard, and
wherein the processors are further configured to establish a connection using a communications protocol based on the WFD standard.

26. A sink device comprising one or more processors, wherein the one or more processors are configured to:
receive a user input back channel (UIBC) parameter message, wherein the UIBC parameter message specifies a Virtual Network Computing (VNC) input type; and
transmit user input data according to the specified VNC input type,
wherein the UIBC message includes a Generic Input Message comprising a Generic Input Type identifier field that specifies the VNC input type and a Describe field that includes:
VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

27. The sink device of claim 26, wherein the VNC input type is one of a VNC KeyEvent input type and a VNC PointerEvent input type.

28. The sink device of claim 26, wherein the UIBC parameter message comprises a Real-Time Streaming Protocol (RTSP) SET_PARAMETER request message.

29. The sink device of claim 26,
wherein the UIBC parameter message comprises a Real-Time Streaming Protocol (RTSP) control message that identifies a User Datagram Protocol (UDP) port, and
wherein the processors are further configured to transmit the user input data by transmitting the user input data using the identified UDP port.

30. The sink device of claim 26, wherein the user input back channel (UIBC) parameter message conforms to a Wi-Fi Display (WFD) standard, and
wherein the processors are further configured to establish a connection using a communications protocol based on the WFD standard.

31. A non-transitory computer-readable storage medium comprising instructions stored thereon that, when executed, configure one or more processors to:
transmit a user input back channel (UIBC) parameter message, wherein the UIBC parameter message specifies a Virtual Network Computing (VNC) input type; and
receive user input data in a UIBC message according to the specified VNC input type, wherein the UIBC message includes a Generic Input Message comprising a Generic Input Type identifier field that specifies the VNC input type and a Describe field that includes:
VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

32. The non-transitory computer-readable storage medium of claim 31, wherein the VNC input type is one of a VNC KeyEvent input type and a VNC PointerEvent input type.

33. The non-transitory computer-readable storage medium of claim 31, wherein the UIBC parameter message comprises a Real-Time Streaming Protocol (RTSP) SET_PARAMETER request message.

34. The non-transitory computer-readable storage medium of claim 31,
wherein the UIBC parameter message comprises a Real-Time Streaming Protocol (RTSP) control message that identifies a User Datagram Protocol (UDP) port, and
wherein to receive the user input data the instructions further configure the one or more processors to receive the user input data using the identified UDP port.

35. The non-transitory computer-readable storage medium of claim 31,
wherein the user input back channel (UIBC) parameter message conforms to a Wi-Fi Display (WFD) standard, and
wherein the instructions further configure the one or more processors to establish a connection using a communications protocol based on the WFD standard.

36. A non-transitory computer-readable storage medium comprising instructions stored thereon that, when executed, configure one or more processors to:
receive a user input back channel (UIBC) parameter message, wherein the UIBC parameter message specifies a Virtual Network Computing (VNC) input type; and
transmit user input data according to the specified VNC input type,
wherein the UIBC message includes a Generic Input Message comprising a Generic Input Type identifier field that specifies the VNC input type and a Describe field that includes:
VNC KeyEvent data for a key event made with respect to a VNC display displayed by a display for a sink device and the user input data in the UIBC message comprises a VNC KeyEvent message comprising a message-type field, a down-flag field describing whether the key is pressed or released, a padding field, and a key field describing the keyboard key pressed, if the Generic Input Type identifier field specifies a VNC KeyEvent input type, and
VNC PointerEvent data for a pointer event made with respect to the VNC display displayed by the display for the sink device and the user input data in the UIBC message comprises a VNC PointerEvent message comprising the message-type field, a button-mask field indicating a state of one or more pointer buttons, an x-position field, and a y-position field, if the Generic Input Type identifier field specifies a VNC PointerEvent input type.

37. The non-transitory computer-readable storage medium of claim 36, wherein the VNC input type is one of a VNC KeyEvent input type and a VNC PointerEvent input type.

38. The non-transitory computer-readable storage medium of claim 36, wherein the UIBC parameter message comprises a Real-Time Streaming Protocol (RTSP) SET_PARAMETER request message.

39. The non-transitory computer-readable storage medium of claim 36,
wherein the UIBC parameter message comprises a Real-Time Streaming Protocol (RTSP) control message that identifies a User Datagram Protocol (UDP) port, and
wherein to transmit the user input data the instructions further configure the one or more processors to transmit the user input data using the identified UDP port.

40. The non-transitory computer-readable storage medium of claim 36,
wherein the user input back channel (UIBC) parameter message conforms to a Wi-Fi Display (WFD) standard, and
wherein the instructions further configure the one or more processors to establish a connection using a communications protocol based on the WFD standard.

* * * * *